United States Patent [19]
Hovorka

[11] 4,153,851
[45] May 8, 1979

[54] MAGNETIC COUPLING

[75] Inventor: Jiri J. Hovorka, Muskogee, Okla.

[73] Assignee: Orin W. Coburn, Muskogee, Okla.

[21] Appl. No.: 815,669

[22] Filed: Jul. 14, 1977

[51] Int. Cl.² .............................................. H02K 7/06
[52] U.S. Cl. ...................................... 310/23; 310/80; 310/103
[58] Field of Search ........................ 310/23, 24, 80, 46, 310/103

[56] References Cited

U.S. PATENT DOCUMENTS

| | | | |
|---|---|---|---|
| 1,724,446 | 8/1929 | Worthington | 310/46 |
| 1,859,643 | 5/1932 | Worthington | 310/46 |
| 3,636,391 | 1/1972 | Horner et al. | 310/24 |
| 3,703,653 | 11/1972 | Tracy et al. | 310/24 |
| 3,879,622 | 4/1975 | Ecklin | 310/80 |
| 3,899,703 | 8/1975 | Kinnison | 310/23 X |
| 3,967,146 | 6/1976 | Howard | 310/24 X |

Primary Examiner—Donovan F. Duggan
Attorney, Agent, or Firm—Dunlap, Codding & McCarthy

[57] ABSTRACT

A rotor and base, rotatingly connected, are each provided with a plurality of magnet assemblies. The magnet assemblies on one of the rotor and base are fixed and the magnet assemblies on the other of the rotor and base are moved radially in synchronization with the rotation of the rotor to produce a torque on the rotor.

28 Claims, 11 Drawing Figures

MAGNETIC COUPLING

FIELD OF THE INVENTION

This invention relates generally to mechanical coupling mechanisms and, in particular but not by way of limitation, to coupling mechanisms employing permanent magnets to maintain the rotational motion of a rotor.

BRIEF DESCRIPTION OF THE DRAWINGS

FIG. 5 is a diagrammatic representation in elevational cross section of the embodiment shown in FIG. 1.

DESCRIPTION OF THE PREFERRED EMBODIMENT

Referring to the drawings and to FIGS. 1, 2, 3 and 4 in particular, shown therein and designated by the general reference numeral 10 is a magnetic coupling constructed in accordance with the present invention. The magnetic coupling 10 generally includes a base assembly 12 and a rotor assembly 14.

The base assembly 12 includes a cylindrical base 16 (sometimes referred to herein as "a second coupling member") constructed of a non-magnetic material such as, for example, aluminum. The base 16 has a coupling face 18, forming an upper surface of the base 16, a lower surface 20 and an outer peripheral surface 22. A coupling axis 24 extends through a central portion of the base 16, the coupling axis 24 being substantially perpendicular to the coupling face 18.

A spirit level 26 is mounted on the coupling face 18 and three leveling screws 28 are connected to the base 16, each leveling screw 28 extending a distance from the lower surface 20 of the base 16. The leveling screws 28 permit the coupling face 18 to be adjusted to a substantially horizontal position.

Figure 4:
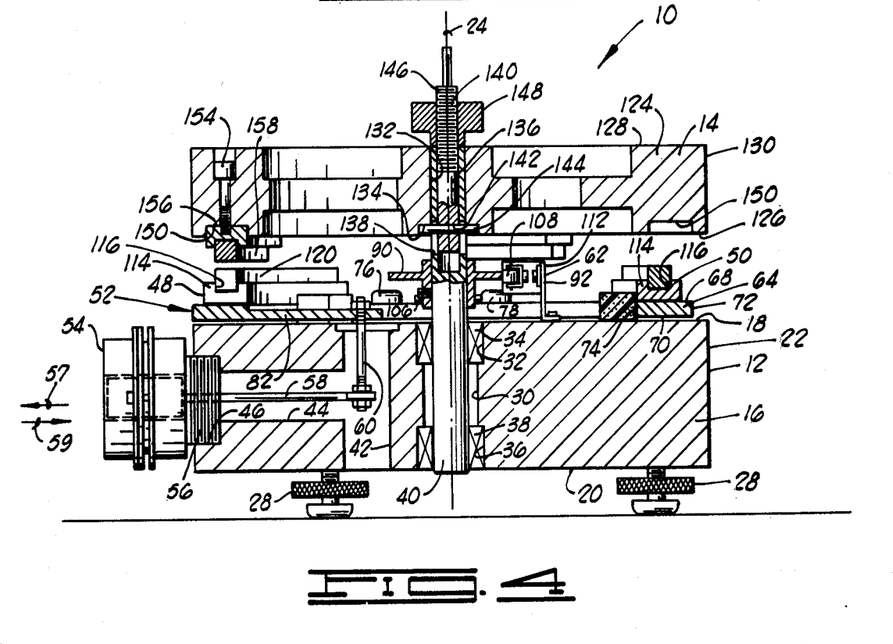
FIG. 4 is a section view in elevation taken substantially along line 4—4 of FIG. 3.

As shown more clearly in FIG. 4, an axial bore 30 is formed in the base 16, the axial bore 30 being formed concentrically with the coupling axis 24 and extending through the base 16 to intersect the coupling face 18 and the lower surface 20 of the base 16. Near the coupling face 18, the axial bore 30 has an enlarged portion 32 and an upper shaft bearing 34 is pressed into the enlarged portion 32. Near the lower surface 20 of the base 16, the axial bore 30 has an enlarged portion 36 and a lower shaft bearing 38 is pressed into the enlarged portion 36. A coupling shaft 40 extends through the axial bore 30 and is journally supported by the upper and lower bearings 34 and 38 for rotation about the coupling axis 24.

An offset bore 42 is formed in the base 16, the offset bore 42 being formed substantially parallel to the axial bore 30 and radially displaced a distance therefrom. The offset bore 42 passes through the base 16 and intersects the coupling face 18 and the lower surface 20.

A radial bore 44 is formed in the base 16. One end of the radial bore 44 intersects the offset bore 42, the bore 44 extending radially through a portion of the base 16 and intersecting the outer peripheral surface 22 of the base 16. Near the outer peripheral surface 22, the radial bore 44 has an enlarged portion 46 which is threaded.

Figure 3:
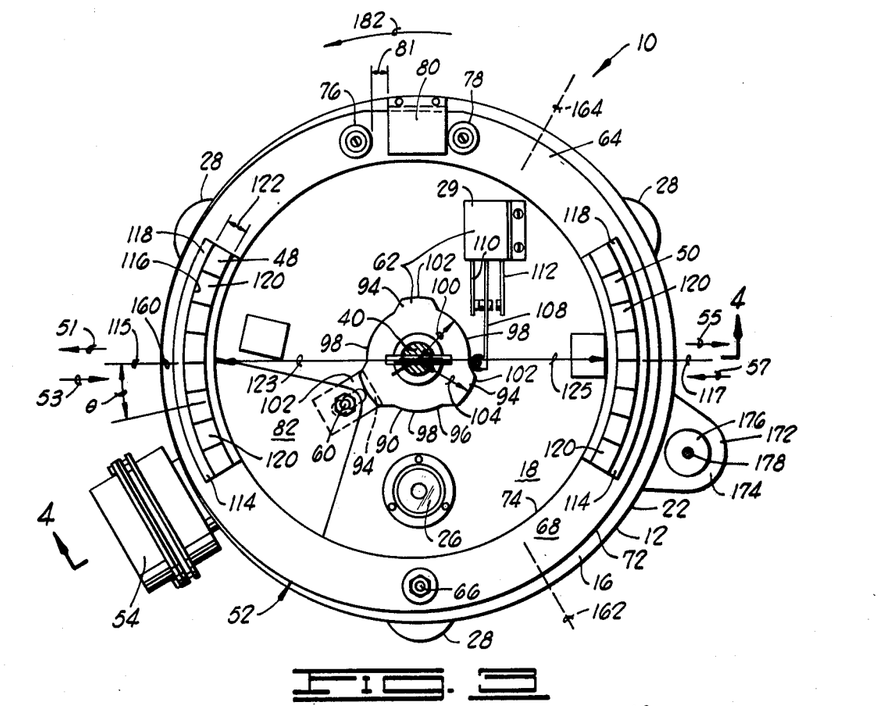
FIG. 3 is a plan view of the base assembly of the embodiment shown in FIG. 1.

The base assembly 12 includes a first stator magnet element 48 and a second stator magnet element 50. The first stator magnet element 48 and the second stator magnet element 50 are sometimes referred to herein as "second magnet assemblies". The first stator magnet element 48 is supported on the coupling face 18 for movement in a radially outward direction 51 generally away from the coupling axis 24 and for movement in a radially inward direction 53 generally toward the coupling axis 24 by a positioning assembly generally designated 52. The second stator magnet element 50 is similarly supported by the positioning assembly 52 for movement in a radially outward direction 55 and for movement in a radially inward direction 57.

The positioning assembly 52 includes a solenoid 54 having a threaded extension 56 which screws into the enlarged portion 46 of the radial bore 44. One end of a drive rod 58 is connected to the solenoid 54 and the drive rod 58 extends from the solenoid 54, through the radial bore 44 and into a portion of the offset bore 42. A linkage 60 is attached to the drive rod 58 and extends therefrom through a portion of the offset bore 42. A portion of the linkage 60 extends a distance generally upward from the coupling face 18 for a purpose to be described herein below.

The solenoid 54 may be conditioned in a first actuated condition to move the drive rod 58 and linkage 60 in a radially outward direction 57 away from the couplins axis 24 and may be conditioned in a second actuated condition to move the drive rod 58 and linkage 60 in a radially inward direction 59 toward the coupling axis 24. For this purpose, the solenoid 54 is provided with a first terminal (not shown) which accepts a first positioning signal to energize the solenoid 54 such that the solenoid 54 is placed in the first actuated condition and with a second terminal (not shown) which accepts a second positoning signal to energize the solenoid 54 such that the solenoid 54 is placed in the second actuated condition. The positioning signals are supplied via a timing assembly 62 from a source of electrical energy which may be, for example but not by way of limitation, electrical power provided by a public utility via a household receptacle. The solenoid 54 has a common terminal (not shown) to provide for the connection of a return path to the source of electrical energy.

The positioning assembly 52 further includes a ring 64 pivotably connected to the coupling face 18 of the base 16 via a pivot 66. The ring 64 has an upper surface 68, a lower surface 70, an outer peipheral surface 72 and an inner peripheral surface 74. The pivot 66 passes through the ring 64 between the outer and inner peripheral surfaces 72 and 74 thereof so that the pivot 66 is connected to the ring 64 at a preselected distance from the center of the ring 64. The pivot 66 is connected to the coupling face 18 at a distance from the coupling asis 24 which is substantially the same as the distance between the pivot 66 and the center of the ring 64 so that the center of the ring 64 may be moved along an arcutate curve intersecting the coupling axis 24.

A first bumper 76 and a second bumper 78 are attached to the upper surface 68 of the ring 64 and the bumpers 76 and 78 are positioned on the ring 64 in substantially diametric opposition with respect to the pivot 66. In particular, the bumpers 76 and 78 are equally spaced on either side of a diameter of the ring 64 extending through the pivot 66. A stop 80 is attached to the base 16 and a portion of the stop 80 is disposed between the bumpers 76 and 78 to limit the extent of the arcuate curve along which the center of the ring 64 may move. The distance between the bumpers 76 and 78 exceeds the width of the stop 80 by a preselected shift distance 81 which will be discussed in more detail below.

A tab 82 is formed on the inner peripheral surface 74 of the ring 64 and extends radially inwardly toward the center of the ring 64 and the coupling axis 24. The tab 82 is connected to the linkage 60 so that, when the solenoid 54 is placed in the first actuated condition to move the linkage 60 in the radially outward direction 57, the ring 64 is moved to a first position wherein the second bumper 74 contacts the stop 80 and so that, when the solenoid 54 is placed in the second actuated condition to move the linkage 60 in the radially inward direction 59, the ring 64 is moved to a second position wherein the first bumper 72 contacts the stop 80.

The positioning assembly 52 further includes the timing assembly 62 for alternately conditioning the solenoid 54 in the first and second actuated conditions or states. The timing assembly 62, shown more clearly in FIG. 3, comprises a cam 90 which is connected to the coupling shaft 40 and an electrical contactor assembly 92 which is attached to the coupling face 18. The cam 90 has three lobes 94 formed on a peripheral surface 96, the lobes 94 being spaced circumferentially about the peripheral surface 96 and dividing the peripheral surface 96 into three first camming surfaces 98 spaced a first cam radius 100 from the coupling axis 24 and three second camming surfaces 102 spaced a second cam radius 104 from the coupling axis 24 (each lobe 94 extends a distance radially from the peripheral surface 96 terminating with the second camming surface 102 and each of the first camming surfaces 98 being disposed on the outer peripheral surface 96 generally between two of the lobes 94 or, in other words, between two of the second camming surfaces 102). As shown in FIG. 4, the cam 90 is secured to the coupling shaft 40 via a set screw 106 so that the cam 90 may be angularly positioned circumferentially about the coupling shaft 40.

The electrical contactor assembly 92 comprises a breaker arm 108 and the electrical contactor assembly 92 is attached to the coupling face 18 such that one portion of the breaker arm 108 engages the peripheral surface 96 of the cam 90. The breaker arm 108 is alternately moved away from the coupling axis 24 by the cam 90 and toward the coupling axis 24 by the cam 90 as the coupling shaft 40 and cam 90 rotate such that the breaker arm 108 alternately engages a first camming surface 98 and a second camming surface 102. The electrical contactor assembly 92 further comprises a first breaker point 110 positioned on one side of the breaker arm 108 so that, when the breaker arm 108 engages the first camming surface 98, the first breaker point 110 contacts the breaker arm 108 and a second breaker point 112 positioned on the opposite side of the breaker arm 108 so that, when the breaker arm 108 engages a second camming surface 102, the second breaker point 112 contacts the breaker arm 108. The breaker arm 108 is connected to the source of electrical power to which the solenoid 54 is connected and the first and second breaker points 110 and 112 are connected to the first and second terminals (not shown) of the solenoid 54, respectively.

Thus, as a coupling shaft 40 is rotated, the breaker arm 108 engages the first camming surface 98 causing the breaker arm 108 to engage the first breaker point 110 thereby connecting the positioning signal to the solenoid 54 for conditioning the solenoid 54 in the first actuated condition causing the ring 64 to be placed in the first position via the connection between the solenoid 54 and the ring 64 provided via the drive rod 58, the linkage 60 and the tab 62. Alternately, as the coupling shaft 40 is rotated, the breaker arm 108 engages the second camming surface 102 causing the breaker arm 108 to engage the second breaker point 112 thereby connecting the positioning signal to the solenoid 54 for conditioning the solenoid 54 in the second actuated condition causing the ring 64 to be placed in the second position via the connection between the solenoid 54 and the ring 64 provided via the drive rod 58, the linkage 60 and the tab 82.

The stator magnet elements 48 and 50 are constructed and are positioned on the ring 64 in a manner now to be described. As shown more clearly in FIG. 3, each stator magnet element 48 and 50 comprises a magnet mount 114 attached to the upper surface 68 of the ring 64 by suitable fasteners (not shown) such as for example, screws. The magnet mounts 114 are arcuately curved such that the magent mounts 114 form segments of a ring; in particular, the lengths of the magnet mounts 114 are such that each magnet mount 114 form a sixty degree (60°) segment of an arc.

The magnet mounts 114 are disposed on the ring 64 such that the center of curvature of each magnet mount 114 coincides with the center of the ring 64 and such that the magnet mount 114 of the first stator magnet element 48 is diametrically opposed on the ring 64 with respect to the magnet mount 114 of the second stator magnet element 50. In particular, a line connecting a radially extending centerline 115 of the magnet mount 114 of the first stator magnet element 48 to the radially extending centerline 117 of the magnet mount 114 of the second stator magnet element 50 will pass through the center of the ring 64 and perpendicularly intersect a diameter thereof passing through the pivot 66.

An arcuately curved slot 116 is formed in the upper surface 118 of each magnet mount 114, the slots 116 being formed concentrically with the arcuate curve of the magnet mounts 114. A plurality of magnets 120 (only some of the magnets 120 being specifically designated via a reference numeral in the drawings for clarity) are disposed within the slots 116 and are attached to the magnet mounts 114 by suitable means, such as, for example, by a suitable adhesive. The magnets 120 are positioned in the magnet mounts 114 such that the magnetization of each magnet 120 is directed radially inwardly toward the center of the ring 64 such that the portion of each magnet 120 nearest the center of ring 64 is a north magnetic pole and the portion of each magnet 120 farthest from the center of the ring 64 is a south magnetic pole. The length 122 of each magnet 120, parallel to the direction of the magnetization thereof, is substantially equal to the shift distance 81 so that, as the ring 64 pivots between the first and second positions, wherein the bumpers 76 and 78 alternately engage the stop 80, the second magnet assemblies 48 and 50 are shifted toward and away from the coupling axis 24 with the magnitude of the shift being equal to substantially one half of the length 122 of the magnets 120.

It will perhaps be well at this point to consider the action of the positioning assembly 52 as the coupling shaft 40 rotates. As the coupling shaft 40 rotates, the breaker arm 108 will alternately engage the first camming surfaces 98 and the second camming surfaces 102 of the cam 90. When the breaker arm 108 engages a first camming surface 98, as illustrated in FIG. 3, electrical contact is made between the breaker arm 108 and the first breaker point 110 to transmit an electrical signal to the solenoid 54, the signal being such to place the solenoid 54 in the first actuated condition thereof. The solenoid 54, via the dirve rod 58, the linkage 60 and the tab 82, will place the ring 64 in the first position thereof, as shown in FIG. 3, when the solenoid 54 is in the first actuated condition.

As the ring 64 is placed in the first position, the first stator magnet element 48 is moved in the radially outward direction 51 with respect to the coupling axis 24 so that, when the ring 64 is placed in the first position, the first stator magnet element 48 will be a first radial distance 123 from the coupling axis 24. The second stator magnet element 50 will be moved in the radially inward direction 53 with respect to the coupling axis 24 as the ring 64 is moved to the first position thereof so that, when the ring 64 is in the first position, the second stator magnet element 50 is disposed a second radial distance 125 from the coupling axis 24. The shift distance 81, previously defined to be the distance by which the spacing between the bumpers 76 and 78 exceeds the width of the stop 80, is selected such that the first radial distance 123 exceeds the second radial distance 125 by an amount equal to one half the lengths 122 of the magnets 120.

As the coupling shaft 40 continues to rotate, the breaker arm 108 is engaged by a second camming surface 102 so that an electrical contact is made between the breaker arm 108 and the second breaker point 112. The second breaker point 112 transmits an electrical signal to the solenoid 54 to place the solenoid 54 in the second actuated condition thereof whereby the solenoid 54 moves the ring 64 to the second position thereof. Because of symmetry of placement of the bumpers 76 and 78 and the stator magnet elements 48 and 50 on the ring 64 with respect to the pivot 66, the second stator magnet assembly 50 will be at the first radial distance 123 from the coupling asix 24 and the first stator magnet element 48 will be at the second radial distance 123 from the coupling axis 24 when the ring 64 is in the second position. Accordingly, as the coupling shaft 40 rotates, the ring 64 is alternately placed in the first and second positions thereof and the stator magnet elements 48 and 50 are alternately positioned at the first and second radial distances 123 and 125 from the coupling axis 24, one of the stator magnet elements 48 and 50 being at the first radial distance 123 while the other of the stator magnet elements 48 and 50 is at the second radial distance 125.

The rotor assembly 14 is attached to the coupling shaft 40 for rotation therewith about the coupling axis 24. The rotor assembly 14 comprises a rotor 124 having a coupling face 126, substantially parallel to the coupling face 18 of the base 16 and forming a lower surface of the rotor 124, an upper surface 128 and an outer peripheral surface 130. As more clearly illustrated in FIG. 4, a rotor bore 132 is formed in the central portions of the rotor 124, the rotor bore 132 passing through the rotor 124 and intersecting the coupling face 126 and the upper surface 128. A transverse groove 134 is formed in the coupling face 126 for connecting the rotor 124 to the coupling shaft 40 and for angularly positioning the rotor 124 thereon. In order to secure the rotor 124 to the coupling shaft 40, a shaft bore 136 is formed axially in the coupling shaft 40 and a transverse slot 138 is formed in the coupling shaft 40, the slot 138 intersecting the shaft bore 136. A rod 140 is partially disposed within the shaft bore 136 and a transverse aperture 142 is formed in the rod 140. The aperture 142 is aligned with the slot 138 in the coupling shaft 40 and with the groove 134 in the coupling face 126 of the rotor 124 and a pin 144 is passed through the aperture 142 to engage the slot 138 and groove 134. The rod 140 has a threaded portion 146 and a nut 148 is screwed on the threaded portion 146 of the rod 140 to vertically position the pin 144 in supporting engagement with the rotor 124.

A groove 150 is formed in the coupling face 126 of the rotor 124, the groove 150 encircling the coupling axis 24 and spaced therefrom by distance substantially equal to the first radial distance 123. A first rotor magnet element 152, a second rotor magnet element 153 and a third rotor magnet element 155 are positioned in the groove 150 and secured to the rotor 124 via fasteners 154, such as, for example, screws (the rotor magnet elements 152, 153 and 155 sometimes being referred to herein as "first magnet assemblies"). With one exception, the rotor magnet elements 152, 153 and 155 are identical to the stator magnet elements 48 and 50. The rotor magnet elements 152, 153 and 155 comprise magnet mounts 156, which are constructed identical to the magnet mounts 114, and a plurality of magnets 158. The rotor magnet elements 152, 153 and 155 differ from the stator magnet elements 48 and 50 only in that the direction of magnetization of the magnets 158 is opposed to the direction of magnetization of the magnets 120 of the second magnet assemblies 48 and 50. While the magnets 120 are magnetized radially inwardly with respect to the center of the ring 64 and, accordingly, substantially with respect to the coupling axis 24, the magnets 158 are magnetized radially outwardly with respect to the coupling axis 24. Thus, portions of the magnets 158 nearest the coupling axis 24 are south magnetic poles, while portions farthest from the coupling axis 24 are north magnetic poles.

As is the case with the stator magnet elements 48 and 50, the rotor magnet elements 152, 153 and 155 are constructed to form sixty degree (60°) segments of arc. The rotor magnet elements 152, 153 and 155 are positioned symmetrically within the groove 150 so that the angular separation of the rotor magent elements 152, 153 and 155 is substantially sixty degrees (60°) of arc. The centerlines of the rotor magnet elements 152, 153 and 155 have been designated by the numerals 160, 162 and 164, respectively, to simplify discussion of the operation of the magnetic coupling 10.

As will be clear from the description of the operation of the magnetic coupling 10 to be given below, the magnetic coupling 10 may be adjusted for rotation of the rotor 124 in either a clockwise or counterclockwise direction as seen from above the magnetic coupling 10. FIGS. 1, 2, 3 and 4 have been drawn for counterclockwise rotation of the rotor 124 and leading edges of the first, second and third rotor magnet elements 152, 153 and 155 for such rotation have been designated by the numerals 166, 168 and 170, respectively.

As has been previously noted, the stator magent elements 48 and 50 are alternately positioned on the coupling face 18 of the base 16 at the first radial distance 123 from the coupling axis 24 and at the second radial distance 125 from the coupling axis 24 as the coupling shaft 40 rotates. The rotor magnet elements 152, 153 and 155, on the other hand, are fixed on the rotor 124 at the first radial distance 123. Since the rotor 124 is fixed to the coupling shaft 40, the rotor 124 will rotate with the coupling shaft 40 so that the rotor magnet elements 152, 153 and 155 will pass above the stator magnet elements 48 and 50 as the rotor 124 rotates. Since the stator magnet elements 48 and 50 oscillate between the first and second radial distances 123 and 125, respectively, while the rotor magent elements 152, 153 and 155 are maintained at the first radial distance 123 from the coupling axis 24, a rotor magnet element 152, 153 and 155 may be radially aligned with a stator magnet element 48 and 50 as a rotor magnet element 152, 153 and 155 passes above the stator magnet element 48 and 50 or radially misaligned therewith. FIG. 5 has been included to illustrate the radial alignment and misalignment of the rotor magnet elements 152, 153 and 155 and the stator magnet elements 48 and 50.

FIG. 5, which is a schematic representation of cross section of the magnetic coupling 10 taken substantially through the centerlines 115 and 117 of the stator magnet elements 48 and 50, shows the situation in which the ring 64 is in the first position and in which portions of the first rotor magnet element 152 are angularly positioned above portions of the first stator magnet element 48 and portions of the second rotor magnet element 153 are angularly positioned above portions of the second stator magnet element 50.

When the magnetic coupling 10 is in the configuration schematically illustrated in FIG. 5, the magnets 120 of the first stator magnet element 48 are radially aligned with the magnets 158 of the first rotor magnet elements 152 so that, since the magnetization of magnets 120 and 158 are oppositely directed, the magnets 120 exert attractive forces on the magnets 158. As a result, the first stator magnet element 48 will exert a net force on the first rotor magnet element 152. The magnitude and direction of this net force will depend upon the angular alignment of the first rotor magnet element 152 with respect to the first stator magnet element 48. The dependence of the force on the first rotor magnet element 152 on the position thereof can, perhaps, be best understood in terms of the potential energy of the first rotor magnet element 152 in the magnetic field produced by the magnets 120 of the first stator magnet element 48. This potential energy will, in general, be an even function of the angle between the centerlines 160 and 115 of the first rotor magnet element 152 and the first stator magnet element 48 and the potential energy will be a minimum when the angle between the centerlines 160 and 115 is zero. Thus, the interaction between the first stator magnet element 48 and the first rotor magnet element 152, when the first stator magnet element 48 and the first rotor magnet element 152 are generally positioned as illustrated in FIG. 5, is such to exert a torque on the rotor 124 to angularly align the centerlines 160 and 115. This interaction will be referred to herein as a potential well interaction. It will be recognized that a potential well interaction may exist between any rotor magnet element 152, 153 and 155 and either stator magnet element 48 and 50. Such an interaction exists at any time during the rotational period of the rotor 124 that a portion of a rotor magnet element 152, 153 and 155 passes above a stator magnet element 48 and 50 when the stator magnet element 48 and 50 is positioned at the first radial distance 123.

A different interaction exists between the second rotor magnet element 153 and the second stator magnet element 50 in the configuration of the magnetic coupling 10 schematically illustrated in FIG. 5. Since the second stator magnet element 50 is positioned at the second radial distance 125, portions of the magnets 158 of the second rotor magnet element 153 adjacent the south magnetic poles thereof are above portions of the magnets 120 of the second stator magnet element 50 adjacent the south magnetic poles thereof. As a result, the potential energy of the second rotor magnet element 153 in the magnetic field produced by the magnets 120 of the second stator magnet element 50 has a different form. While the potential energy of the second rotor magnet element 153 will also be an even function of the angle between the centerline 162 of the second rotor magnet element 153 and the centerline 117 of the second stator magnet element 50, the potential energy of the second rotor magnet element 153 will be a maximum when the centerline 162 is angularly aligned with the centerline 117. As a result, the interaction between the second rotor magnet element 153 and the second stator magnet element 50 will be such to increase any angular misalignment between the centerlines 162 and 117 thereof when portions of the second rotor magnet element 153 are angularly positioned above portions of the second stator magnet element 50 and the second stator magnet element 50 is at the second radial distance 125. A force having these characteristics will be referred to herein as a potential hill interaction. It will, of course, be recognized that a potential hill interaction may be established between any rotor magnet element 152, 153 and 155 and either stator magnet element 48 or 50 by positioning the stator magent element 48 and 50 at the second radial distance and angularly positioning the rotor magnet element 152, 153 and 155 substantially above the stator magnet element 48 and 50.

Figure 2:
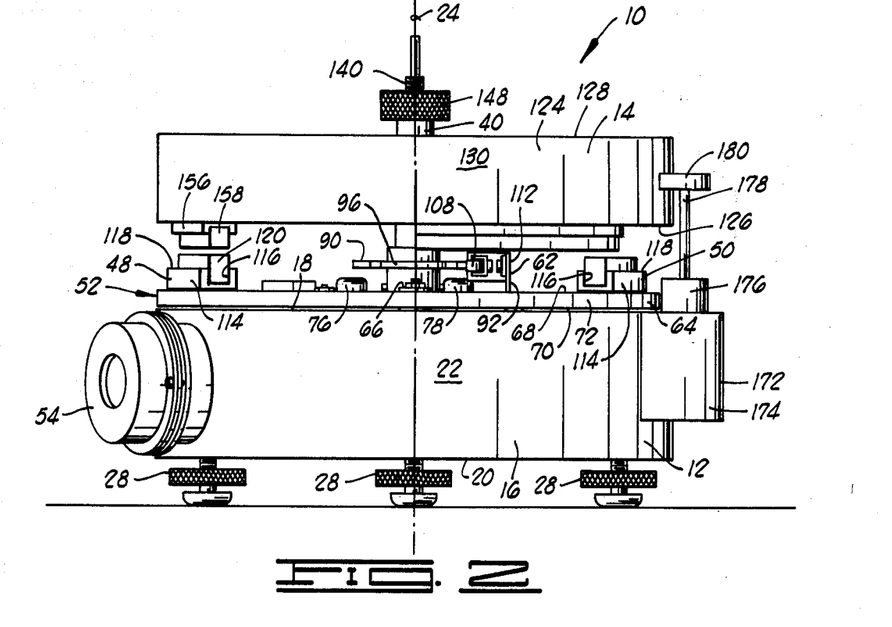
FIG. 2 is an elevational view of the embodiment shown in FIG. 1.

The magnetic coupling 10 is provided with a starting assembly 172 (more clearly shown in FIG. 2). The starting assembly 172 includes an electric motor 174 connected to the outer peripheral surface 22 of the base 16 and an electrically actuated clutch 176 which is connected to the drive shaft (not shown) of the electric motor 174 in a conventional manner. Such motors and clutches are well known in the art and need not be further discussed herein. It suffices for purposes of this disclosure to note that the starting assembly 172 is provided with an output shaft 178 extending from the clutch 176, which may be driven by the motor 174 via the clutch 176 when the clutch 176 is placed in an actuated state while the motor 174 is operating. When the clutch 176 is deactuated, the output shaft 178 feewheels. The output shaft 178 extends generally upwardly from the base 16 and is provided with a drive wheel 180 which engages the outer peripher surface 130 of the rotor 124.

OPERATION OF THE FIRST PREFERRED EMBODIMENT

Figure 1:
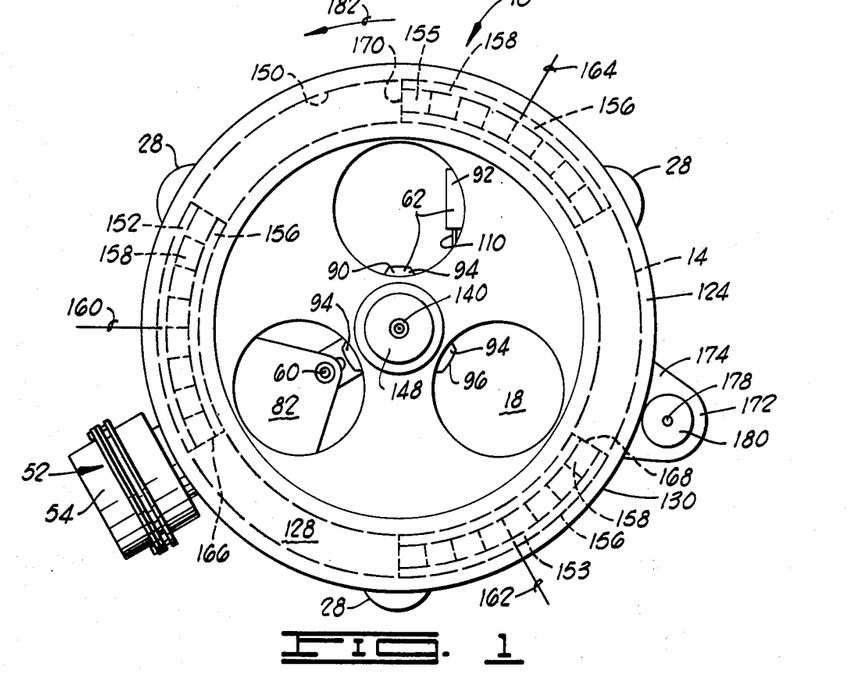
FIG. 1 is a plan view of one embodiment of the magnetic coupling.

As has been previously noted, the magnetic coupling 10 may be operated to turn the rotor 124 on the base 16 in either a clockwise or counterclockwise direction as seen from above the magnetic coupling 10. Moreover, the magnetic coupling 10 may be set to operate at various speeds. Both the direction of rotation of the rotor 124 and the operating speed thereof are selected by angularly positioning the cam 90 on the coupling shaft 40 with respect to the angular positions of the first magnet assemblies 152, 153 and 155 on the rotor 124. FIG. 1 illustrates the relative angular positioning of the cam 90 and the first magnet assemblies 152, 153 and 155 for substantially maximum rotational speed of the rotor 124 in the counterclockwise direction 182 indicated in FIG. 1. When the magnetic coupling is set for such operation, lines drawn from the coupling axis 24 to the leading edges 166, 168 and 170 of the first magnet assemblies 152, 153 and 155 will bisect the second camming surfaces 102 of the cam 90 as indicated by the dashed lines in FIG. 1.

Rotational motion is initially imparted to the rotor 124 by the starting assembly 172. The motor 174 is energized and the clutch 176 is actuated so that the motor 174 turns the output shaft 178 and drive wheel 180 in a clockwise direction as seen from above the magnetic coupling 10. The drive wheel 180 engages the peripheral surface 130 of the rotor 124 thereby rotatingly driving the rotor 124 in the direction 182.

When the rotor 124 reaches the rotation rate selected by the angular positioning of the cam 90, the motor 174 is de-energized and the clutch 176 is deactuated so that the drive wheel 180 and the output shaft 178 free wheel. Subsequently, the rotation of the rotor 124 is maintained by alternately shifting the ring 64 between the first and second positions thereof as will now be explained.

The subsequent operation of the magnetic coupling 10 can perhaps be best understood in terms of a succession of power strokes, one of which will now be described. In FIG. 3, with regard to which the power stroke will be described, the direction 182 has been indicated with respect to the cam 90 which rotates with the rotor 124 via the connection of the rotor 124 and the cam 90 to the coupling shaft 40. The angular position of the cam 90 and of the centerlines 160, 162 and 164 of the first magnet assemblies 152, 153 and 155 at the beginning of the power stroke have been indicated in FIG. 3.

At the angular position of the cam 90 shown in FIG. 3, the breaker arm 108 will be in engagement with a first camming surface 98 so that the breaker arm 108 will be in contact with the first breaker point 110. As a result, the ring 64 will be in the first position thereof so that the first stator magnet element 48 will be at the first radial distance 123 from the coupling axis 24 and the second stator magnet element 50 will be at the second radial distance 125 from the coupling axis 24. Accordingly, a potential well interaction will exist between the first rotor magnet element 152 and counter balancing potential hill interactions will exist between the second and third rotor magnet elements 152, 155 and the second stator magnet element 50.

As the rotor 124 turns through a small angle (indicated by the angle $\theta$ in FIG. 3) in the direction 182, the breaker arm 108 disengages the first camming surface 98 and engages a second camming surface 102 so that the ring 64 will be shifted to the second position. The shift of the ring 64 to the second position moves the first rotor magnet element 48 to the second radial distance 125 from the coupling axis 24. Accordingly, the potential well interaction between the first rotor magnet element 152 and the first stator magnet element 48 is changed to a potential hill interaction so that the forces exerted on the magnets 158 of the first rotor magnet element 152 will be such to increase the angle $\theta$; that is, the magnetic interaction between the first rotor magnet element 152 and the first stator magnet element 48 is such to drive the rotor 124 in the direction 182.

As the first stator magnet element 48 is moved to the second radial distance 125, the second stator magnet element 50 is moved to the first radial distance 123 so that the interactions between the second and third rotor magnet elements 153 and 155 and the second stator magnet element 50 are transformed from potential hill to potential well interactions. However, these interactions will no longer be in balance. Since the rotor 124 has turned through the small angle $\theta$, the angle between the centerline 162 of the second rotor magnet element 153 and the centerline 117 of the second stator magnet element 50 will be less than the angle between the centerline 164 of the third rotor magnet element 155 and the centerline 117 of the second stator magnet element 50. As a result, the net force exerted on the second rotor magnet element 153 by the second stator magnet element 50, such force tending to turn the rotor 124 in the direction 182, will exceed the force, tending to turn the rotor 124 in the direction opposed to the direction 182, between the third rotor magnet element 155 and the second stator magnet element 50. Accordingly, the result of the interaction between the second stator magnet element 50 and the second and third rotor magnet elements 153 and 155 will be a force which turns the rotor 124 in the direction 182.

The power stroke continues with the first rotor magnet element 152 being driven by the first stator magnet element 48 and the second rotor magnet element 153 being driven by the second stator magnet element 50 to turn the rotor 124 in the direction of 182 until the centerline 162 of the second rotor magnet element 153 comes into angular alignment with the centerline 117 of the second stator magnet element 50. At this point, the geometrical relationship between the second rotor magnet element 153 and the second stator magnet element 50 will be the same as the geometrical relationship between the first rotor magnet element 152 and the first stator magnet element 48 at the beginning of the power stroke and the geometric relationships between the first stator magnet element 48 and the first and third rotor magnet elements 152 and 155 will be the same as the geometrical relationships between the second stator magnet element 50 and the second and third rotor magnet elements 153 and 155 at the beginning of the power stroke.

The next power stroke proceeds in the same manner as the above described power stroke. As the rotor 124 turns through an additional small angle, the breaker arm 108 disengages the second camming surface 102, engaged thereby during the above described power stroke, and engages a first camming surface 98 to shift the ring 64 back to the first position thereof. The result of the shift is to transform the potential well interaction between the second rotor magnet element 153 and the second stator magnet element 50 to a potential hill interaction, which drives the rotor 124 in the direction 182 and to transform the potential hill interactions between the first stator magnet element 48 and the first and third rotor magnet elements 152 and 155 to potential well interactions which will also drive the rotor in the direction 182. Accordingly, each time the centerline 160, 162 or 164 of a rotor magnet element 152, 153 or 155 passes the centerline 115 and 117 of a stator magnet element 48 and 50, a power stroke is delivered to the rotor 124 to drive the rotor 124 in the direction 182.

The angular speed of the rotor 124 is adjusted by loosening the set screw 106 that secures the cam 90 to the coupling shaft 40 and angularly repositioning the cam 90 on the coupling shaft 40 to either advance or retard the transitions from the potential well interactions to potential hill interactions and from potential hill interactions to potential well interactions. For example, if the transition from the potential well interaction to the potential hill interaction between the first rotor magnet element 152 and the first stator magent element 48 in the above described power stroke occurs prematurely, the first stator magnet element 48 will exert a retarding force on the first rotor magnet element 152, that is, a force tending to turn the rotor 124 in the direction opposed to the direction 182, during the short time period between the transition to the potential hill interaction and the time at which the centerline 160 of the first rotor magnet element 152 comes into angular alignment with the centerline 115 of the first stator magnet element 48.

The magnetic coupling 10 is set for rotation in the clockwise direction; that is, the direction opposed to the direction 182 by repositioning a cam 90 by an angle of sixty degrees (60°) on a coupling shaft 40 to redefine the leading edges of the rotor magnet elements 152, 153 and 155.

EMBODIMENT OF FIGS. 6, 7, 8, 9, 10 and 11

Figure 6:
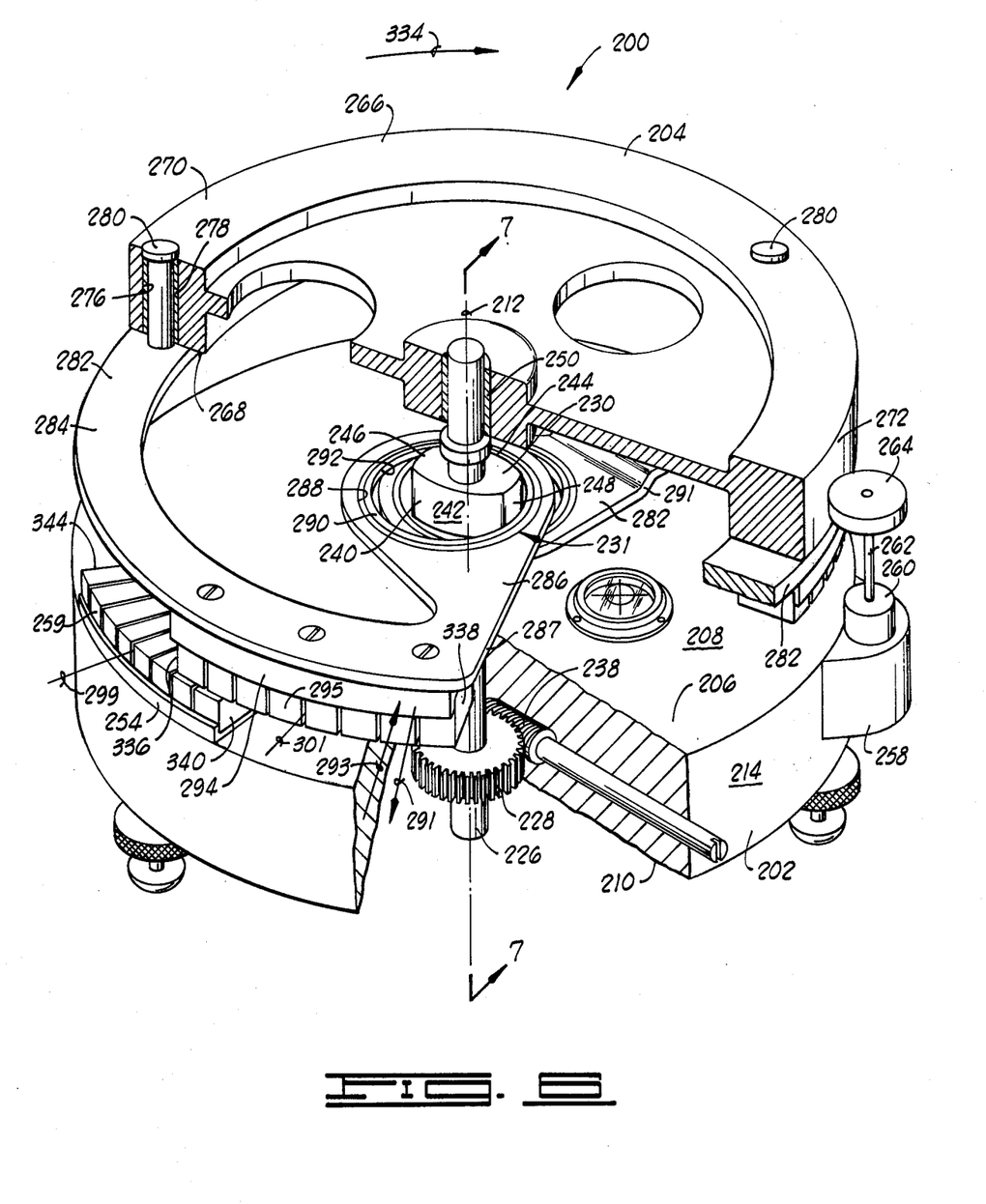
FIG. 6 is an isometric view in partial cutaway of a second embodiment of the magnetic coupling.
Figure 7:
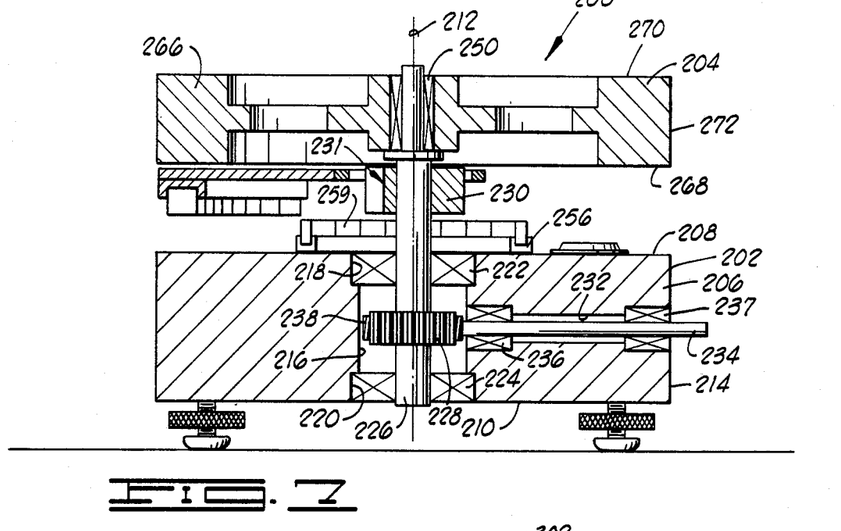
FIG. 7 is a cross sectional view of the embodiment of FIG. 6 taken substantially along line 7—7 of FIG. 6.

Referring now to FIGS. 6, 7, 8 and 9, and to FIGS. 6 and 7 in particular, illustrated therein and designated by the general reference numeral 200 is a modified magnetic coupling constructed in accordance with the present invention. Portions of the modified magnetic coupling 200 illustrated in FIG. 6 have been cut away to more clearly illustrate the construction thereof. The modified magnetic coupling 200 generally includes a base assembly 202 and a rotor assembly 204.

The base assembly 202 includes a cylindrical base 206 having a coupling face 208, forming an upper surface of the cylindrical base 206, a lower surface 210, and an outer peripheral surface 214. A coupling axis 212 extends through central portions of the cylindrical base 206, the coupling axis 212 intersecting the lower surface 210 and the coupling surface 208, and the coupling axis 212 being substantially perpendicular to the coupling face 208. Formed concentrically with the coupling axis 212 is an axial bore 216 intersecting the coupling face 208 and the lower surface 210 of the base 206. Adjacent the coupling face 208 of the base 206, the axial bore 216 has an upper enlarged portion 218. Adjacent the lower surface 210 of the base 206, the axial bore 216 has a lower enlarged portion 220. An upper bearing 222 is pressed into the upper enlarged portion 218 and a lower bearing 224 is pressed into the lower enlarged portion 220. A coupling shaft 226, whose axis coincides with coupling axis 212 of the base 206, is rotatingly mounted within the axial bore 216 via the upper bearing 222 and the lower bearing 224. A portion of the shaft 226 extends beyond the coupling face 208 of the base 206 for mounting the rotor assembly 204 on the base assembly 202. Within the axial bore 216, a worm gear 228 is mounted on the coupling shaft 226.

A transverse bore 232 is formed in the base 206, the transverse bore 232 intersecting the axial bore 216 extending therefrom to the outer peripheral surface 214 of the base 206 and intersecting the outer peripheral surface 214. A worm shaft 234 is rotatingly secured within the transverse bore 232 via bearings 236 and 237. A worm 238 is secured to the worm shaft 234 and meshingly engages the worm gear 228 for turning the coupling shaft 226 about the coupling axis 212.

Figures 8, 9:
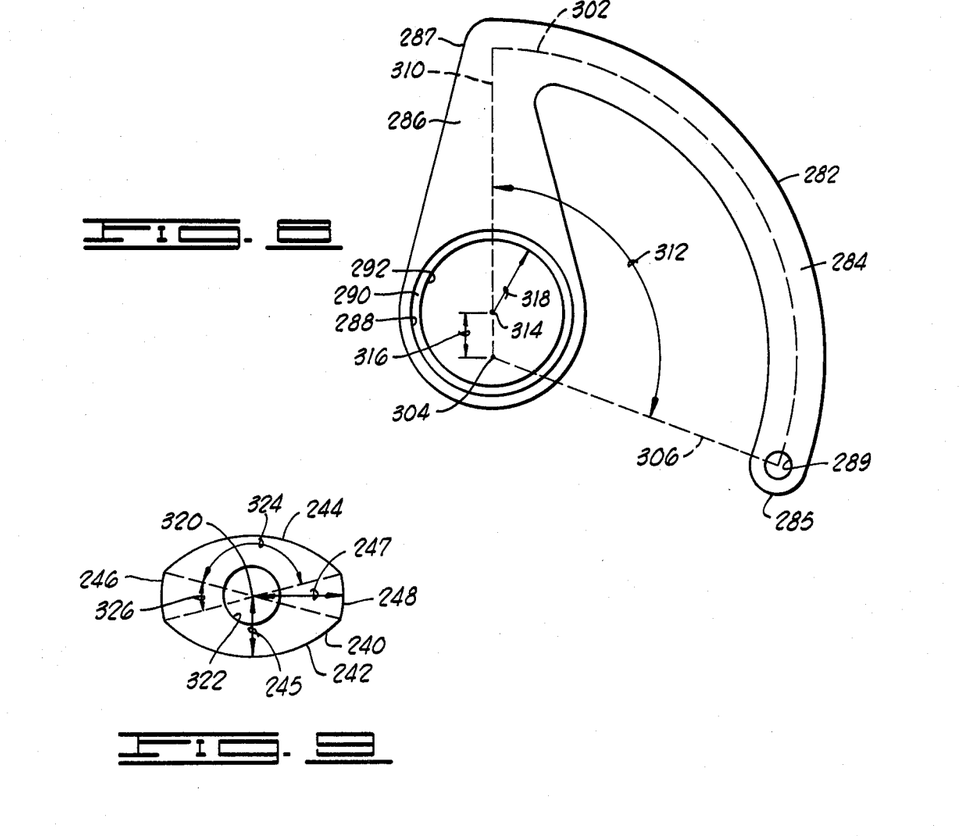
FIG. 8 is a plan view of an oscillator of the embodiment of FIG. 6.
FIG. 9 is a plan view of the cam of the embodiment of FIG. 6.
Figure 9:
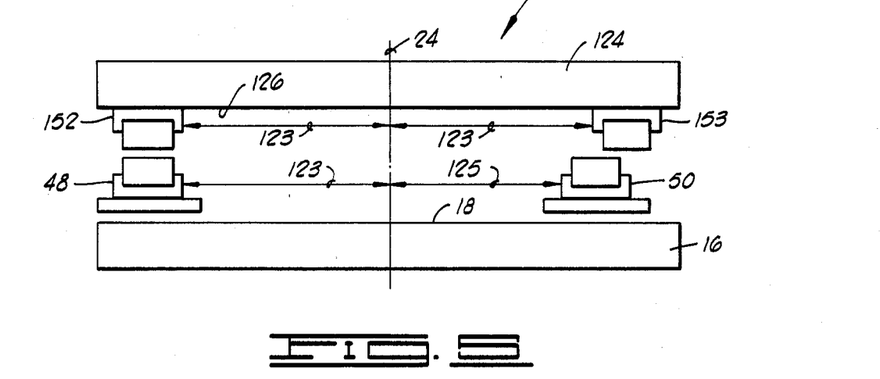

A cam 230, which forms a portion of a positioning assembly 231 as will be described more fully below, is symmetrically mounted on the coupling shaft 226 and has an outer peripheral surface 240, which is divided into four arcuate camming surfaces. Two first camming surfaces 242 and 244, each subtending an angle of substantially one hundred fifty degrees (150°) are disposed on opposite sides of the coupling shaft 226. Interspersed between the first camming surfaces 242 and 244 are second camming surfaces 246 and 248, each subtending an angle of substantially thirty degrees (30°) about the coupling shaft 212. As is shown in FIG. 9, the first camming surfaces 242 and 244 are disposed or formed on a first cam radius 245 from the coupling axis 212 and each of the second camming surfaces 246 and 248 are disposed or formed on a second cam radius 247 from the coupling axis 212. The second cam radius 247 is greater than the first cam radius 245 so that the cam 230 is approximately elliptical in shape. The purpose of the cam 230 will be described more fully below.

A first stator magnet element 254 and a second stator magnet element 256 (illustrated in FIG. 7) are attached to the coupling face 208 of the base 206. The first stator magnet element 254 and the second stator magnet element 256 are sometimes referred to herein as "first magnet assemblies", and are identical to the stator magnet elements 48 and 50 of the magnetic coupling 10 described in detail before. The stator magnet elements 254 and 256 are arcuately curved and are positioned on the coupling face 208 such that the center of curvature of each stator magnet element 254 and 256 coincides with the coupling axis 212 and such that the second stator magnet element 256 is diametrically opposed to the first stator magnet element 254. The stator magent elements 254 and 256 are positioned a first radial distance 263 (see FIGS. 10 and 11) from the coupling axis 212 and each stator magent element 254 and 256 subtends an angle of substantially sixty degrees (60°) thereabout. Each stator magnet element 254 and 256 comprises a plurality of magnets 259 magnetized substantially radially toward the coupling axis 212 and each magnet 259 has a preselected length 261 (see FIGS. 10 and 11) parallel to the direction of the magnetization thereof.

An electrical motor 258, having a clutch 260, is mounted on the outer peripheral surface 214 of the base 206. A shaft 262 extends from a clutch 260 in a direction substantially parallel to the coupling axis 212. A drive wheel 264 is secured to the shaft 262. The clutch 260 may be electrically engaged such that the motor 258 drives the drive wheel 264 or disengaged such that the drive wheel 264 free wheels.

The rotor assembly 204 is rotatingly mounted on the coupling shaft 226 via a bearing 250 for rotation about the coupling axis 212. The rotor assembly 204 generally includes a circular rotor 266, having a coupling face 268 forming a lower surface of the rotor 266, an upper surface 270 and an outer peripheral surface 272. The coupling face 268 is substantially parallel to the coupling face 208 of the base 206. The drive wheel 264 engages the outer peripheral surface 272 of the rotor 266 so that rotational motion about the coupling axis 212 may be imparted to the rotor 266 by the electric motor 258 via the drive wheel 264 when the clutch 260 is engaged.

Symmetrically spaced about the coupling axis 212 and near the outer peripheral surface 272 of the rotor 266 are three oscillator bores 276 (one oscillator bore 276 is shown in FIG. 6). Each oscillator bore 276 passes through the rotor 266 substantially parallel to the coupling axis 212, the oscillator bore 276 intersecting the coupling face 268 and the upper surface 270 of the rotor 266. The oscillator bores 276 are radially positioned in the rotor 266 such that the distance between the oscillator bores 276 and the coupling axis 212 is slightly larger than the first radial distance 263. The oscillator bores 276 are angularly positioned in the rotor 266 such that portions of the rotor 266 between any two oscillator bores 276 subtend an angle of substantially one hundred twenty degrees (120°) about the coupling axis 212. Bearings 278 are pressed into the oscillator bores 276 and pins 280 are pivotally secured within the oscillator bores 276 via the bearings 278. The pins 280 support oscillators 282 along the coupling face 268 of the rotor 266. The oscillators 282 and the cam 230 form the positioning assembly 231.

The construction of the oscillators 282 is more clearly shown in FIG. 8. As shown therein, each oscillator 282 comprises an arcuate body member 284 having a curvature substantially equal to the curvature of the outer peripheral surface 272 of the rotor 266 and extending through an angle of arc of substantially one hundred twenty degrees (120°). A hole 289 is formed near a pivot end 285 of the body member 284 so that the oscillator 282 may be pivotally mounted on the coupling face 268 and securing the oscillator 282, by a suitable adhesive for example, to the pin 280. Opposed to the pivot end 285, along the arc of the body member 284 is a free end 287 and each oscillator 282 has a cam arm 286 which extends toward the coupling axis 212 from portions of the body member 284 adjacent the free end 287 thereof. The cam arm 286 of two of the oscillators 282 are provided with zig-zag bends 291 (one such bend is shown in FIG. 6) so that portions of the cam arms 286 of the three oscillators 282 may be stacked in the vicinity of the coupling axis 212. The cam arm 286 of each oscillator 282 has a circular aperture 288 through which the coupling shaft 226 and the cam 230 pass. A bearing 290 is pressed into the aperture 288 so that an inner cylindrical surface 292 of the bearing 290 engages the periphery 240 of the cam 230.

When the rotor 266 rotates about the coupling axis 212, as will be described hereinbelow, the free ends 287 of the oscillators 282 are moved or thrown radially outwardly from the coupling axis 212 so that the inner cylindrical surfaces 292 of the bearings 290 are pressed against and roll on the cam 230. Accordingly, the free end 287 of the body member 284 of each oscillator 282 will alternately move in a radially outward direction 291 to a first position, when the inner cylindrical surface 292 of the bearing 290 engages a first camming surface 242 or 244, and in a radially inward direction 293 to a second position, when the inner cylindrical surface 292 of the bearing 290 engages a second camming surface 246 or 248; that is, the body member 284 of each oscillator 282 will oscillate radially with the amplitude dictated by the shape of the cam 230. In accordance with the present invention, the second cam radius 247 exceeds the first cam radius 245 by a distance equal to one-half the length 261 of the magnets 259 in the first magnet assemblies 254 and 256 so that the amplitude of the oscillations of the oscillators 282 is equal to one-half the length 261 of the magnets 259.

Mounted on each oscillator 282, generally away from the coupling face 268 of the rotor 266 and substantially adjacent the free end 287 of the body member 284, is a rotor magnet element 294 which is constructed identically to the rotor magnet elements 152, 153 and 155 of the magnetic coupling 10 described in detail before. The rotor magnet elements 294 will sometimes be referred to herein as "second magnet assemblies". Each rotor magnet element 294 comprises a plurality permanent magnets 295 subtending an arc of about sixty degrees (60°) about the coupling axis 212. The magnets 295 are constructed identically to the magnets 259 in the stator magnet elements 254 and 256; in particular, the length 297 (see FIGS. 10 and 11) of each magnet 295 is equal to the length 261 of each magnet 259. However, the magnets 295 are oriented such that the directions of the magnetizations thereof are generally opposed to the directions of the magnetizations of the magnets 259; that is, whereas the magnetizations of the magnets 259 are directed radially inwardly toward the coupling axis 212, the magnetizations of the magnets 295 are directed radially outwardly from the coupling axis 212.

The rotor magnet elements 294 are positioned on the oscillators 282 such that, when an oscillator 282 is in the first position thereof, the rotor magnet element 294 thereon will be disposed the first radial distance 263 from the coupling axis 212. When the oscillator 282 is at the second position thereof wherein the oscillator 282 has been drawn radially inwardly by the cam 230 a distance equal to one-half the length of a magnet 261 or 295 of the stator magnet elements 254 or 256 and the rotor magnet elements 294, respectively, the rotor magnet element 294 will be disposed a second radial distance 300 from the coupling axis 212.

Figure 10:
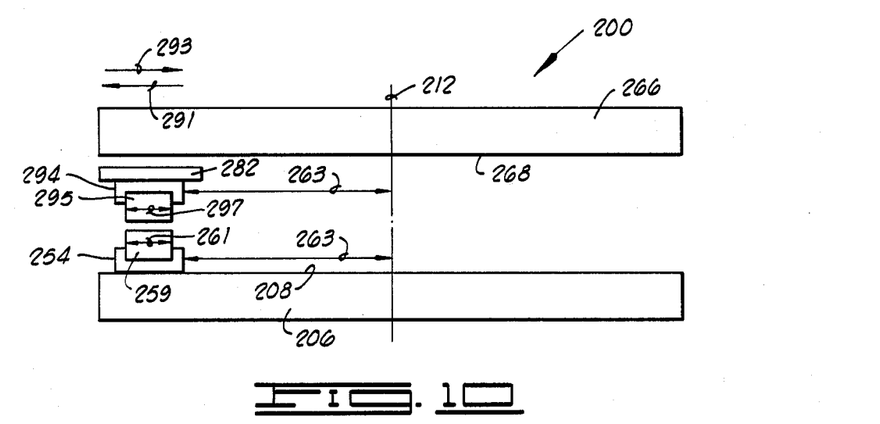
FIG. 10 is a diagrammatic representation of the embodiment of FIG. 6 in elevational cross section corresponding to one angular position of the rotor.
Figure 11:
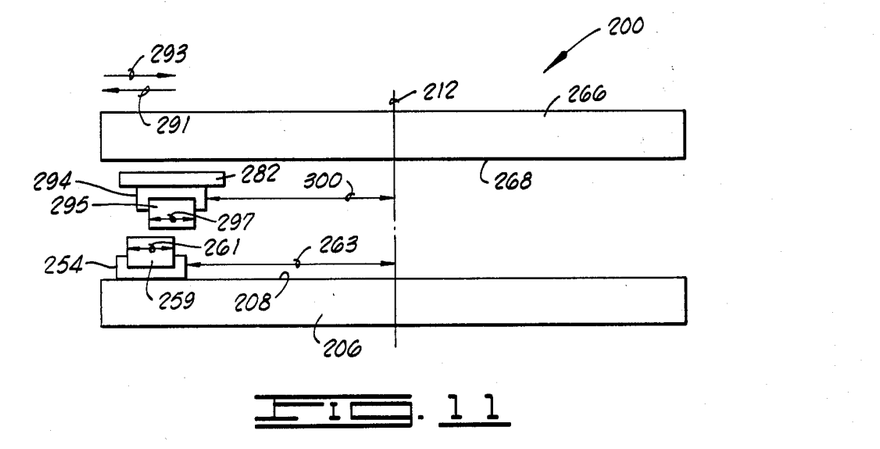
FIG. 11 is a diagrammatic representation of the embodiment in FIG. 6 in elevational cross section corresponding to a second angular position of the rotor.

FIGS. 10 and 11, which are schematic representations of a cross section of the modified magnet coupling 200, have been provided to illustrate the radial positioning of the rotor magnet elements 294 relative to the stator magnet elements 254 and 256 when an oscillator 282 is in the first position (FIG. 10) and in the second position (FIG. 11). The numerical designations in FIGS. 8 and 9 correspond to the numerical desigantions of portions of the modified magnet coupling 200 represented therein.

FIG. 10 illustrates the radial positioning of a rotor magnet element 294 relative to the first stator magnet element 254 when the oscillator 282 supporting the rotor magnet element 294 is in the first position and portions of the rotor magnet element 294 are angularly aligned with portions of the rotor magnet element 254. Since the direction of the magnetization of the magnets 261 of the stator magnet elements 254 is opposed to the direction of the magnetization of the magnets 295 of the rotor magnet element 294, the magnetic interaction between the rotor magnet element 294 and the stator magnet element 254 represented in FIG. 8 will be a magnetic well interaction, as described before with respect to the magnet coupling 10. Thus, when the rotor magnet element 294 is radially aligned with the stator magnet element 254 as in FIG. 10, the stator magnet element 254 will exert a force on the rotor magnet element 294 tending to angularly align centerlines 299 and 301 (see FIG. 6) of the stator magnet element 254 and the rotor magnet element 294, respectively.

FIG. 11 illustrates the radial positioning of a rotor magnet element 294 with respect to the first stator magnet element 254 when the oscillator 282 supporting the rotor magnet element 294 is in the second position thereof and when portions of the rotor magnet element 294 are angularly positioned above the first stator magent element 254. Since the magnetizations of the magnets 295 of the rotor magnet element 294 are directed radially outwardly with respect to the coupling axis 212, the radially outermost portions of the magnets 295 are north magnetic poles, and since the magnetizations of the magnets 295 of the stator magnet elements 254 and 256 are directed radially inwardly with respect to the coupling axis 212, the radially innermost portions of the magnets 259 are north magnetic poles. Thus, for the relative radial positioning of the rotor magnet element 294 and the first stator magnet element 254 illustrated in FIG. 8, the north poles of the magnets 295 will be substantially adjacent the north poles of the magnets 259 so that the interaction between the rotor magnet element 294 and the first stator magnet element 254 in FIG. 9 will be a magnetic hill interaction as previously described in conjunction with the magnetic coupling 10. Accordingly, the first stator magnet element 254 in FIG. 9 will exert a force on the rotor magnet element 294 in FIG. 9 to increase any misalignment of the centerlines 301 and 299 of the rotor magnet element 295 of the first stator magnet element 254, respectively.

The operation of the modified magnetic coupling 200 is similar to the operation of the magnetic coupling 10 in that transitions from magnetic well interactions to magnetic hill interactions between the rotor magnetic elements 294 and the stator magnet elements 254 and 256 as the rotor magnet elements 294 pass over the stator magnet elements 254 and 256 are utilized to maintain the rotation of the rotor 266. However, the timing of the transitions is carried out by the construction of the oscillators 282 and the cam 230 rather than by a separate timing assembly such as the timing assembly 62 of the magnetic coupling 10. FIGS. 8 and 9 have been provided to illustrate an example, but not a limitation, of one set of dimensions of the oscillators 282 and one set of dimensions of the cam 230 which will provide the transitions which will be described hereinbelow.

It will be recognized by those skilled in the art that the parts of the modified magnetic coupling 200 may be increased or decreased in size by the same scale factor without changing the geometrical relationships dictated by the relative dimensions of the parts. Accordingly, dimensions will be given in the following discussion in units of magnet length; that is, the lengths 261 and 297 of the magnets 259 and 295, respectively, have been assigned a length of one unit.

As shown in FIG. 8, each oscillator 292 is generally constructed about a wedge 302 forming a portion of a circular area centered on a wedge center 304. The wedge 302 has a first side 306 extending from the wedge center 304 to the hole 289. A second side 310 of the wedge 302 extends from the wedge center 304 and terminates near the free end 287 of the oscillator 282. The angular separation 312 of the first and second sides 306 and 310 of the wedge 302 is substantially one hundred ten degrees (110°) and the length of each side 306 and 310 is substantially nine (9) units. The rotor magnet elements 294 are centered on the body members 284 of the oscillators 282 and the first radial distance 263 is substantially eight and a quarter (8.25) units.

The center of the circular aperture 288 in the cam arm 286 is displaced from the wedge center 304 along the second side 310 of the wedge 302 such that the bearing 290 is centered on a bearing center 314 disposed a bearing off-set distance 316 from the wedge center 304. In the modified magnetic coupling 200, the bearing offset distance 316 is substantially one and one-half (1.5) units and the inner cylindrical surface 292 of the bearing 290 has a bearing radius 318 which is substantially two and one-half (2.5) units.

The construction of the cam 230 is shown in FIG. 9. The cam 230 is symmetrically constructed about a cam center 320 through which the coupling axis 212 passes when the cam 230 is attached to the coupling shaft 226. The cam 230 is provided with a central bore 322 to permit mounting of the cam 230 on the coupling shaft 226. The first camming surfaces 242 and 244 each subtend an angle 324 about the cam center 320, the angle 324 being substantially one hundred and fifty degrees (150°). The second camming surfaces 246 and 248 each subtend an angle 326 about the cam center 320, the angle 326 being substantially thirty degrees (30°). The first cam radius 245 is substantially one (1) unit and the second cam radius 247 is substantially one and one-half (1.5) units. The radii of curvature of the first camming surfaces 242 and 244 are substantially three (3) units and the radii of curvature of the second camming surfaces 246 and 248 are substantially two and one-half (2.5) units.

OPERATION OF FIGS. 6, 7, 8, 9, 10 and 11

The modified magnetic coupling 200 may be operated such that the rotor 266 turns in either a clockwise direction or a counterclockwise direction as seen from above the modified magnetic coupling 200. Since counterclockwise operation will be clear from a description of the clockwise operation, only clockwise operation, that is, operation in the direction indicated by the arrow 334 in FIG. 6, will be described. It will be noted that the modified magnetic coupling 200 may be set for counterclockwise operation by rotating the cam 230, via rotation of the worm gear 228 by the worm 238 to rotate the coupling shaft 226, through an angle of approximately sixty degrees (60°).

The rate of rotation of the rotor 266 may be varied as will be described below. The following description of the operation of the modified magnetic coupling 200 is for maximum rotational rate; that is, rotation limited only by frictional forces and by a load connected to the rotor 266.

The modified magnetic coupling 200 possesses a high degree of symmetry and an understanding of the manner in which this symmetry enters into the operation of the modified magnetic coupling 200 will contribute to an understanding of the operation thereof. Since the oscillators 282 differ only in the provision of zig-zag bonds in the cam arms 286 of two oscillators 282 to permit vertical stacking of the cam arms 286 in the vicinity of the coupling axis 212, since the pins 280 by means of which the oscillators 282 are attached to the rotor 266 are equally angularly spaced about the rotor 266, and since all oscillators 282 are alternately placed in the first and second positions by the same set of first camming surfaces 242 and 244 and second camming surfaces 246 and 248, the motions of the oscillators 282 differ only in time of occurrence. Any motion of one oscillator 282, at any angular position with respect to the base 206, will be repeated by another oscillator 282, at the same angular position with respect to the base 206, one third of a period of rotation of the rotor 266 later and by the third oscillator two thirds of a period of rotation later. Since the cam 230 is bilaterally symmetric and since the stator magent elements 254 and 256 are symmetrically positioned on the base 206, any motion of a rotor magnet element 294 with respect to the first stator magnet element 254 will be repeated with respect to the second stator magnet element 256 one half period of rotation of the rotor 266 later. Accordingly, an understanding of the interaction between one rotor magnet element 294 and the first stator magnet element 254 as the rotor magnet element 294 passes over the first stator magnet element 254 is sufficient to provide an understanding of the operation of the modified magnetic coupling 200.

As the rotor 266 turns in the direction 334, each rotor magnet element 294 will move along a substantially circular path so that each rotor magnet element 294 will have a leading edge 336 and a trailing edge 338, as indicated in FIG. 6. As the rotor magnet element 294 comes into angular alignment with the first stator magnet element 254, the leading edge 336 will pass above a first edge 340 of the first stator magnet element 254 and, a short time later, above a second edge 344 of the first stator magnet element 254.

Rotation is initially imparted to the rotor 266 by the motor 258 via the drive wheel 264. As the angular velocity of the rotor 266 is increased, a centrifugal force will be exerted on the body members 284 of the oscillators 282 and on the rotor magnet elements 294 to pivot the oscillators 282 radially outwardly from the coupling axis 212 about the pins 280. As a result, the inner cylindrical surfaces 292 of the bearing 290 will be pressed against the cam 230 so that the oscillators 282 will commence radial oscillation wherein the oscillators 282 alternately move between the first position and the second position such that the rotor magnet elements 294 alternately oscillate between the first radial distance 263 and the second radial distance 300 as the rotor 266 turns. Accordingly, the radial position of each rotor magnet element 294 will be functionally related to the angular position of the rotor 266 with respect to the base 206. As will be clear to those skilled in the art, this functional relationship will be determined by the geometry of the oscillators 282 and the cam 230.

The geometries of the oscillators 282 and of the cam 230 recited previously are such that the functional relationship between the radial positions of the rotor magnet element 294 and the angular orientation of the rotor 266 is divided into eight intervals. The first interval, extending through an angle of rotation of the rotor 266 of substantially thirty degrees (30°), begins when the inner cylindrical surface 292 of the bearing 290 engages the first camming surface 244 and commences rolling thereon. The first interval ends when the inner cylindrical surface 292 engages the intersection between the first camming surface 244 and second camming surface 248 so that the inner cylindrical surface 292 begins to lift away from the first camming surface 244. During the first interval, the oscillator will be in the first position thereof and the rotor magnet element 294 will be radially positioned the first radial distance 263 from the coupling axis 212.

The second interval begins as the first interval ends and continues during a further rotation of the rotor 266 through an angle of substantially sixty degrees (60°). During the second interval, the inner cylindrical surface 292 of the bearing 290 pivots about the intersection of the first camming surface 244 and the second camming surface 248 and the rotor magnet element 294 moves toward the coupling axis 212. Because of the above recited geometries of the oscillator 282 and the cam 230, the rate at which the rotor magnet element 294 moves toward the coupling axis 212 with changing orientation of the rotor 266 is nearly linear with most of the radially inward displacement of the rotor magnet element 294 from the first position 263 to the second position 300 occurs.

During the third interval, which commences when the second interval ends and continues for an additional thirty degrees (30°) rotation of the rotor 266, the inner cylindrical surface 292 of the bearing 290 moves, at the midpoint of the third interval, into engagement with the second camming surface 248 and then engages the intersection between the second camming surface 248 and the first camming surface 242 to lift away from the second camming surface 248. The rotor magnet element 294 will be at the second radial distance 300 when the inner cylindrical surface 292 of the bearing 290 engages the second camming surface 248 and very nearly at the second radial distance 300 during other portions of the third interval.

The fourth interval is the inverse of the second interval, wherein the rotor turns an additional sixty degrees (60°) and the rotor magnet element 294 moves radially outwardly to the first radial distance 263. The fourth interval ends when the inner cylindrical surface 292 of the bearing 290 commences rolling on the first camming surface 242. The fifth, sixth, seventh and eighth intervals repeat the first, second, third and fourth intervals, respectively.

The modified magnetic coupling 200 is adjusted for maximum angular velocity of the rotor 266 by angularly positioning the cam 230, by means of the worm 238 and the worm gear 228, such that the first interval commences when the leading edge 336 of the rotor magnet element 294 is angularaly aligned with the first edge 340 of the stator magnet element 254. Rotation of the rotor 266 is initiated by the electric motor 258, as previously discussed, to force the bearings 290 against the cam 230, and rotation of the rotor 266 is maintained by the interaction between the rotor magnet elements 294 and the first and second stator magnet elements 254 and 256 and the motor 258.

Since the first interval commences when the leading edge 336 of the rotor magnet element 294 is angularly aligned with the first edge 340 of the first stator magnet element 254 and continues for a rotation of the rotor 266 through an angle of substantially thirty degrees (30°) and since the rotor magnet element 294 is radially positioned at the first radial distance 263 from the coupling axis 212 during the first interval, the interaction between the rotor magnet element 294 and the first stator magnet element 254 will be a potential well interaction as the leading edge 336 of the rotor magnet element 294 moves from the first edge 340 of the first rotor magnet element 254 to the centerline 299 thereof. Accordingly, the first stator magnet element 254 will exert a force on the rotor magnet element 294 to align the centerlines 301 and 299 of the rotor magnet element 294 and the stator magnet element 254, respectively; that is, to turn the rotor 266 in the direction 334.

The rotor magnet element 294 will begin moving radially inwardly as the leading edge 336 thereof passes the centerline 299 of the first stator magnet element 254; that is, as the second interval commences, and will continue to move radially inwardly as the rotor 266 turns through an additional angle of sixty degrees (60°). During the second interval, the interaction between the rotor magnet element 294 and the first stator magnet element 254 changes from a potential well interaction to a potential hill interaction with the interaction becoming substantially neutra; that is, neither well nor hill, as the centerline 301 of the rotor magnet element 294 passes above the centerline 299 of the first stator magnet element 254. Thus, during substantially the first half of a second interval, the interaction between the first stator magnet element 254 and the rotor magnet element 294 will be a potential well interaction of decreasing magnitude so that the first stator magnet element 254 will exert a steadily decreasing force on the rotor magnet element 294 to turn the rotor 266 in the direction 334. As the centerline 301 of the rotor magnet element 294 passes the centerline 299 of the first stator magnet element 254, the interaction between the rotor magnet element 294 and the first stator magnet element 254 will begin to increase. However, the interaction will be an increasing potential hill interaction so that the force exerted on the rotor magnet element 294 by the first stator magnet element 254 will be such to increase the angular displacement between the centerline 301 of the rotor magnet element 294 and the centerline 299 of the first stator magnet element 254; that is, the force exerted on the rotor magnet element 294 by the first stator magnet element 254 will be such as to continue to turn the rotor 266 in the direction 334.

During the third interval, the rotor magnet element 294 will be radially positioned at substantially the second radial distance 300 so that the interaction between the rotor 294 and the first stator magnet element 254 will be a potential hill interaction tending to increase the angular misalignment of the centerlines 301 and 299 of the rotor magnet element 294 and the first stator magnet element 254, respectively. Since the third interval begins as a trailing edge 338 of the rotor magnet element 294 passes above the centerline 265 of the first stator magnet element 254, the direction of the force exerted on the rotor magnet element 294 by the first stator magnet element 254 will be such as to continue the rotation of the rotor 266 in the direction 334. During the fourth interval, the rotor magnet element 294 is returned to the first radial distance 263 from the coupling axis 212 so that the above described power stroke will be repeated as the rotor magnet element 294 passes above the second stator magnet element 256.

The rotational speed of the rotor 266 is controlled by adjustment of the orientation of the cam 230 with respect to the base 206 via the worm 238 and the worm gear 228.

For example, the cam 230 may be turned through an angle in the direction 334 to decrease the angular velocity of the rotor 266. In such a case, the eighth interval of rotation of the rotor 266 will not have ended when the leading edge 336 of the rotor magnet element 294 becomes angularly aligned with the first edge 340 of the first stator magnet element 254 so that the initial potential well interaction between the rotor magnet element 294 and the first stator magnet element 254 will be of reduced magnitude. Moreover, the interaction between the rotor magnet element 294 and the stator magnet element 254 will be a potential well interaction for the short time period after the centerline 301 of the rotor magnet element 294 passes the centerline 299 of the first stator magnet element 254 required for the rotor 266 to rotate through the angle by which the cam 230 has been turned. During this period, the force exerted on the rotor magnet element 294 by the first stator magnet element 254 will be such to align the centerlines 301 and 299 of the rotor magnet element 294 and the first stator magnet 254, respectively; that is, the force on the rotor magnet element 294 will be such to retard the rotation of the rotor 266. Accordingly, angular reorientation of the cam 230 in the direction 334 will reduce the angular velocity of the rotor 266.

While two presently preferred embodiments of the present invention have been described for purposes of this disclosure, numerous changes may be made which will readily suggest themselves to those skilled in the art and which are encompassed within the spirit of the invention disclosed and as defined in the appended claims.

What is claimed is:

1. A magnetic coupling, comprising:
   a first coupling member having a substantially planar coupling face;
   a second coupling member having a substantially planar coupling face, the coupling face of the second coupling member being disposed in a plane substantially parallel to the planar disposition of the coupling face of first coupling member and spaced a distance therefrom;
   means rotatingly supporting one of the first coupling member and the second coupling member for allowing rotation of one of the first coupling member and the second coupling member relative to the other of the first coupling member and the second coupling member about a coupling axis;
   means for rotating one of the first and the second coupling members about the coupling axis;
   at least one first magnet assembly connected to the coupling face of the first coupling member, each first magnet assembly being spaced a first radial distance from the coupling axis;
   at least one second magnet assembly movably supported on the coupling face of the second coupling member, each second magnet assembly being movable in a radially outward direction relative to a coupling axis and in an radially inward direction relative to the coupling axis; and
   positioning means connected to each of the second magnet assemblies for alternately positioning the second magnet assemblies at the first radial diatance from the coupling axis and at a second radial distance from the coupling axis during the rotation of one of the first and the second coupling members.

2. The magnetic coupling of claim 1 wherein each first magnet assembly comprises at least one magnet, magnetized substantially in one of the radially outward direction and the radially inward direction, and wherein each second magnet assembly comprises at least one magnet, magnetized substantially in one of the radially inward direction and the radially outward direction, opposite the direction of magnetization of the magnets of the first magnet assembly.

3. The magnetic coupling of claim 2 wherein the means rotatingly supporting one of the first coupling member and the second coupling member is a shaft rotatably supported by the second coupling member for rotation of the shaft about the coupling axis; and wherein the first coupling member is connected to the shaft for rotation therewith; and wherein the positioning means comprises:

a ring pivotally supported on the coupling face of the second coupling member and having the second magnetic assemblies mounted thereon, the ring being pivotable to a first position wherein one predetermined second magnet assembly is spaced the first radial distance from the coupling axis and being pivotable to a second position wherein the one predetermined second magnet assembly is spaced the second radial distance from the coupling axis; and means for alternately pivoting the ring to the first position and to the second position.

4. The magnetic coupling of claim 3 having three first magnet assemblies and two second magnet assemblies.

5. The magnetic coupling of claim 3 wherein the means for alternately pivoting the ring to the first position and to the second position comprises:

a solenoid connected to the ring for pivoting the ring to the first position in response to receiving a first positioning signal and for pivoting the ring to a second position in response to receiving a second positioning signal; and timing means in electrical communication with the solenoid for transmitting the first positioning signal to the solenoid during preselected portions of the rotational period of the first coupling member and for transmitting the second positioning signal to the solenoid during other preselected portions of the rotational period of the first coupling member.

6. The magnetic coupling of claim 5 wherein the second coupling member is characterized as having an offset bore formed therein and intersecting the coupling face formed on the second coupling member; and wherein the second coupling member has a radial bore formed therein, the radial bore intersecting the offset bore and extending therefrom radially outwardly from the coupling axis, the radial bore supporting the solenoid; and wherein a portion of the ring forms a tab extending radially inwardly toward the coupling axis; and wherein the means for pivoting the ring to the first position and to the second position further comprises:

a drive rod disposed partially within the radial bore and having one end extending into the offset bore and the other end connected to the solenoid; and a linkage disposed partially within the offset bore and having one end connected to the drive rod and the other end extending from the coupling face of the second coupling member and connecting to the tab portion of the ring.

7. The magnetic coupling of claim 5 wherein the timing means comprises:

an electrical contactor assembly supported by the second coupling member for transmitting the first positioning signal to the solenoid in one condition of the electrical contactor assembly and for transmitting the second positioning signal to the solenoid in one other condition of the electrical contactor assembly; and a cam supported by the shaft for rotation therewith about the coupling axis, the cam engaging the electrical contactor assembly to alternately place the electrical contactor assembly in one condition thereof for transmitting the first positioning signal and to place the electrical contactor assembly in one other condition thereof for transmitting the second positioning signal.

8. The magnetic coupling of claim 2 wherein the means supporting one of the first coupling member and the second member is a shaft supported by the first coupling member along the coupling axis; and wherein the second coupling member is generally supported by the shaft for rotation about the coupling axis; and wherein the positioning means comprises at least one oscillator pivotally supported on the coupling face of the second coupling member for circular motion about the coupling axis as the second coupling member rotates about the coupling axis, each oscillator having one second magnet assembly mounted thereon and each oscillator being pivotable to a first position wherein the second magnet assembly is spaced the first radial distance from the first coupling axis and pivotable to a second position wherein the second magnet assembly is spaced the second radial distance from the coupling axis.

9. The magnet coupling of claim 8 wherein the positioning means further comprises a cam mounted on the shaft, the cam having at least one first camming surface spaced a first cam radius from the coupling axis and at least one second camming surface spaced a second cam radius from the coupling axis; and wherein each oscillator comprises a cam arm extending toward the coupling axis to alternately engage the first camming surface and the second camming surface as the oscillator circles the coupling axis, the first cam radius being preselected to place the oscillator in the first position when the cam arm engages the first camming surface and the second cam radius being preselected to place the oscillator in the second position when the cam arm engages the second camming surface.

10. The magnetic coupling of claim 9 wherein the shaft is rotatably supported by the first coupling member; and wherein the magnetic coupling further comprises:

a worm gear mounted on the shaft; and a worm rotatingly supported by the first coupling member and engaging the worm gear for rotating the worm gear whereby the shaft and the cam may be angularly positioned by turning the worm.

11. The magnetic coupling of claim 9 having two first magnet assemblies and wherein the cam has two first camming surfaces bilaterally symmetrically positioned on the peripheral surface of the cam and two second camming surfaces bilaterally symmetrically positioned on the peripheral surface of the cam; and wherein the second camming surfaces are interspersed between the first camming surfaces.

12. The magnetic coupling of claim 11 having three oscillators symmetrically disposed on the coupling face of the second coupling member and three second magnet assemblies, each magnet assembly being mounted on one of the oscillators.

13. A magnetic coupling, comprising: a base assembly, comprising:

a base having a substantially planar coupling face;

a shaft journally mounted on the base for rotation about a coupling axis substantially perpendicular to the coupling face of the base;

a first stator magnet element movably supported on the coupling face of the base, the first stator magnet element being movable in a radially outward direction relative to the coupling axis and in a radially inward direction relative to the coupling axis;

a second stator magnet element movably supported on the coupling face of the base, the second stator magnet element being movable in a radially outward direction relative to the coupling axis and in a radially inward direction relative to the coupling axis; and positioning means connected to the first and second stator magnet elements for alternately positioning the first stator magnet element at a first radial distance from the coupling axis while positioning the second stator magnet element at a second radial distance from the coupling axis and for positioning the first stator magnet element at the second radial distance while positioning the second stator magnet element at the first radial distance; and a rotor assembly, comprising:
  a rotor connector to the shaft for rotation therewith about the coupling axis, the rotor having a substantially planar coupling face disposed in a plane substantially parallel to the planar disposition of the coupling face on the base and spaced a distance therefrom; and
  three rotor magnet elements connected to the coupling face of the rotor, each rotor magnet element being spaced the first radial distance from the coupling axis; and means for rotating the rotor assembly about the coupling axis.

14. The magnetic coupling of claim 13 wherein the positioning means comprises:
  a ring pivotally supported on the coupling face of the base and having the first stator magnet element and the second stator magnet element mounted thereon, the ring pivotable to a first position wherein the first stator magnet element is spaced the first radial distance from the coupling axis and to a second position wherein the second stator magnet element is spaced the first radial distance from the coupling axis; and
  means for alternately pivoting the ring to the first position and to the second position.

15. The magnetic coupling of claim 14 wherein the means for alternately pivoting the ring to the first position and to the second position comprises:
  a solenoid connected to the ring for pivoting the ring to the first position in response to receiving a first positioning signal and for pivoting the ring to the second position in response to receiving a second position signal; and
  timing means in electrical communication with the solenoid for transmitting the first positioning signal to the solenoid during preselected portions of the rotational period of the rotor and for transmitting the second positioning signal to the solenoid during other preselected portions of the rotational period of the rotor.

16. The magnetic coupling of claim 15 wherein the base is characterized as having an offset bore formed therein and intersecting the coupling face formed on the base; and wherein the base has a radial bore formed therein, the radial bore intersecting the offset bore and extending therefrom radially outwardly from the coupling axis, the radial bore supporting the solenoid; and wherein a portion of the ring forms a tab extending radially inwardly toward the coupling axis; and wherein the means for pivoting the ring to the first position and to the second position further comprises:
  a drive rod disposed partially within the radial bore and having one end extending into the offset bore and the other end connected to the solenoid; and
  a linkage disposed partially within the offset bore and having one end connected to the drive rod and the other end extending from the coupling face of the base and connecting to the tab portion of the ring.

17. The magnetic coupling of claim 15 wherein the timing means comprises:
  an electrical contactor assembly in electrical communication with the solenoid for transmitting the first positioning signal to the solenoid in one condition of the electrical contactor assembly and for transmitting the second positioning signal to the solenoid in one other condition of the electrical contactor assembly; and
  a cam supported by the shaft and rotating therewith about the coupling axis, the cam having three first camming surfaces spaced a first cam radius from the coupling axis and three second camming surfaces interposed between the first camming surfaces and spaced a second cam radius from the coupling axis, the first camming surfaces engaging the electrical contactor assembly during three preselected portions of the rotational period of the rotor for placing the electrical contactor assembly in one condition thereof causing the first positioning signal to be transmitted to the solenoid and the second camming surfaces engaging the electrical contactor assembly during three other preselected portions of the rotational period of the rotor for placing the electrical contactor means in the other condition thereof causing the second positioning signal to be transmitted to the solenoid.

18. The magnetic coupling of claim 17 wherein the first stator magnet element subtends an angle of about sixty degrees (60°) about the coupling axis; and wherein the second stator magnet element subtends an angle of about sixty degress (60°) about the coupling axis; and wherein each rotor magnet element subtends an angle of about sixty degrees (60°) about the coupling axis.

19. The magnetic coupling of claim 18 wherein the first stator magnet element and the second stator magnet element are characterized as being in diametric opposition on the ring and wherein each rotor magnet element is characterized as being angularly separated from each of the other rotor magnet elements by an angle of about sixty degrees (60°).

20. The magnetic coupling of claim 19 wherein the first stator magnet element comprises a plurality of magnets, each magnet magnetized substantially in one of the radially outward direction and the radially inward direction; and wherein the second stator magnet element comprises a plurality of magnets, each magnet magnetized substantially in the same one of the radially outward direction and the radially inward direction as the magnets of the first stator magent element; and wherein each rotor magnet element comprises a plurality of magnets, each magnet magnetized in one of the radially outward direction and radially inward direction, opposite the direction of magnetization of the magnets of the first and second stator magent elements.

21. The magnetic coupling of claim 13 further comprising a plurality of leveling screws connected to the base for leveling the magnetic coupling.

22. A magnetic coupling, comprising:

a base assembly, comprising:
  a base having a substantially planar coupling face;
  a shaft supported by the base along a coupling axis substantially perpendicular to the coupling face of the base;
  a first stator magnet element attached to the coupling face of the base at a first radial distance from the coupling axis; and
  a second stator magnet element attached to the coupling face of the base at the first radial distance from the coupling axis; and
a rotor assembly comprising:
  a rotor generally mounted on the shaft for rotating about the coupling axis, the rotor having a substantially planar coupling face disposed in a plane substantially parallel to the planar disposition of the coupling face on the base and spaced a distance therefrom;
  means for rotating the rotor about the coupling axis;
  three rotor magnet element, each rotor magnet element movably supported on the coupling face of the rotor for movement in a radially outward direction and in a radially inward direction; and
  three oscillators, each oscillator pivotally attached to the coupling face of the rotor and each oscillator supporting one of the rotor magnet elements for alternately moving each rotor magnet element to a first radial distance from the coupling axis in a first position of the oscillator and to a second radial distance from the coupling axis in a second position of the oscillator.

23. The magnetic coupling of claim 22 wherein the base assembly further comprises a cam mounted on the shaft, the cam having two first camming surfaces spaced a first cam radius from the coupling axis and two second camming surfaces interspersed between the first camming surfaces and spaced a second cam radius from the coupling axis; and wherein each oscillator comprises a cam arm engaging the cam, the cam arm alternately engaging the first camming surfaces for placing the oscillator in the first position during preselected portions of the rotational period of the rotor and engaging the second camming surfaces for placing the oscillator in the second position during other preselected portions of the rotational period of the rotor.

24. The magnetic coupling of claim 23 wherein the shaft is rotatably supported on the base and wherein the base assembly further comprises:
  a worm gear mounted on the shaft; and
  a worm rotatably supported on the base, the worm engaging the worm gear for rotating the worm gear whereby the shaft and cam may be angularly positioned with respect to the coupling axis.

25. The magnetic coupling of claim 24 wherein the first stator magnet element subtends an angle of about sixty degrees (60°) about the coupling axis; and wherein the second stator magnet element subtends an angle of about sixty degrees (60°) about the coupling axis; and wherein each rotor magnet element subtends an angle of about sixty degrees (60°) about the coupling axis.

26. The magnetic coupling of claim 25 wherein the first stator magnet element and the second stator magnet element are characterized as being in substantial diametric opposition on the coupling face of the base and the rotor magnet elements are characterized as being angularly separated on the coupling face of the rotor by angles of about sixty degrees (60°).

27. The magnetic coupling of claim 26 wherein the first stator magnet element comprises a plurality of magnets, each magnet thereof magnetized substantially in one of the radially inward direction and the radially outward direction; and wherein the second stator magnet element comprises a plurality of magnets, each magnet thereof magnetized substantially in the same one of the radially inward direction and the radially outward direction as the magnets of the first stator magnet element; and wherein each rotor magnet element comprises a plurality of magnets, each magnet thereof magnetized in one of the radially inward direction and the radially outward direction, opposite the direction of magnetization of the magnets of the first and second stator magnet elements.

28. The magnetic coupling of claim 22 further comprising a plurality of leveling screws connected to the base for leveling the magnetic coupling.

* * * * *